United States Patent
Mim et al.

(10) Patent No.: US 8,363,967 B2
(45) Date of Patent: Jan. 29, 2013

(54) METHOD AND APPARATUS FOR INTRAPREDICTION ENCODING/DECODING USING IMAGE INPAINTING

(75) Inventors: Jung-hye Mim, Yongin-si (KR); Woo-jin Han, Suwon-si (KR); Yu-mi Sohn, Seongnam-si (KR); Jeong-hoon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1103 days.

(21) Appl. No.: 12/129,782

(22) Filed: May 30, 2008

(65) Prior Publication Data

US 2008/0310744 A1 Dec. 18, 2008

(30) Foreign Application Priority Data

Jun. 14, 2007 (KR) ........................ 10-2007-0058580

(51) Int. Cl.
*G06K 9/36* (2006.01)
*G06K 9/46* (2006.01)

(52) U.S. Cl. ........................ 382/238; 382/233
(58) Field of Classification Search .................. 382/233, 382/238; 348/240.12, 240.13
See application file for complete search history.

(56) References Cited

U.S. PATENT DOCUMENTS

| | | | |
|---|---|---|---|
| 6,148,109 A | 11/2000 | Boon et al. | |
| 6,987,520 B2 * | 1/2006 | Criminisi et al. | 345/629 |
| 7,088,870 B2 | 8/2006 | Perez et al. | |
| 7,394,855 B2 * | 7/2008 | Kong et al. | 375/240.27 |
| 8,019,171 B2 * | 9/2011 | Sun et al. | 382/243 |
| 2004/0164996 A1 | 8/2004 | Criminisi et al. | |
| 2006/0257042 A1 | 11/2006 | Ofek et al. | |
| 2007/0053443 A1 | 3/2007 | Song | |
| 2009/0238276 A1 * | 9/2009 | Har-Noy et al. | 375/240.13 |

FOREIGN PATENT DOCUMENTS

| | | |
|---|---|---|
| CN | 1929612 A | 3/2007 |
| JP | 2010-507335 A | 3/2010 |

OTHER PUBLICATIONS

Chinese Office Action issued in corresponding Chinese patent application No. 200880020003.4 on May 16, 2011.
Criminisi et al. "Region Filling and Object Removal by Exemplar-Based Image Painting." IEEE Transactions on Image Processing, IEEE Service Center, Piscataway, New Jersey, vol. 13, No. 9, pp. 1200-1212, Sep. 1, 2004.
Examination Report dated Sep. 16, 2011 from the European Patent Office in counterpart European application No. 08766194.8.
Gangal et al. "Automatic Restoration of Old Motion Picture Films Using Spatiotemporal Exemplar-Based Inpainting." Advanced Concepts for Intelligent Vision Systems Lecture Notes in Computer Science, LNCS, Springer, Berlin, Germany, pp. 55-66, Jan. 1, 2006.

(Continued)

*Primary Examiner* — Phuoc Tran
(74) *Attorney, Agent, or Firm* — Sughrue Mion, PLLC

(57) ABSTRACT

A method and apparatus for intraprediction encoding/decoding is provided. The method includes performing image inpainting based on pixels included in a previously encoded region of a current picture among pixels that are adjacent to a boundary between a current block and the previously encoded region of the current picture in order to predict the current block, and performing prediction encoding on the current block using the prediction result. Thus, a new intraprediction mode in which the current block can be accurately predicted can be provided.

17 Claims, 13 Drawing Sheets

OTHER PUBLICATIONS

Guo et al. "Priority-based Template Matching Intra Prediction." Video Coding Experts Group of ITU 33rd Meeting, Shenzhen, China, pp. 1-8, Oct. 20, 2007.

Search Report dated Aug. 31, 2011 from the European Patent Office in counterpart European application No. 08766194.8.

Tan et al. "Intra Prediction by Averaged Template Matching Predictors." Consumer Communications and Networking Conference, 4th IEEE, pp. 405-409, Jan. 1, 2007.

Yang et al. "A Block-Matching Based Intra Frame Prediction for H.264/AVC." 2006 IEEE International Conference on Multimedia and Expo, Toronto, Canada, IEEE, Piscataway, New Jersey, pp. 705-708, Jul. 1, 2006.

Communication dated Jul. 24, 2012 issued by the Japanese Patent Office in counterpart Japanese Application No. 2010-512067.

* cited by examiner 0 (VERTICAL)

1 (HORIZONTAL)

2 (DC)

3 (PLANE)

METHOD AND APPARATUS FOR INTRAPREDICTION ENCODING/DECODING USING IMAGE INPAINTING

CROSS-REFERENCE TO RELATED PATENT APPLICATION

This application claims priority from Korean Patent Application No. 10-2007-0058580, filed on Jun. 14, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to intraprediction encoding/decoding, and more particularly, to intrapredicting a current block and then encoding and decoding the current block based on the intraprediction result.

2. Description of the Related Art

In video compression standards such as moving picture expert group (MPEG)-1, MPEG-2, and H.264/MPEG-4 advanced video coding (AVC), a picture is divided into macroblocks for video encoding. Each of the macroblocks is then encoded using interprediction and intraprediction. Next, an optimal encoding mode is selected based on the size of data of the encoded macroblock and the degree of distortion between the encoded macroblock and the original macroblock. The macroblock is encoded in the selected encoding mode.

In intraprediction, instead of referring to reference pictures, the current block is encoded using a pixel that is spatially adjacent to the current block to be encoded. First, a prediction block for the current block to be encoded is generated using a pixel value of a pixel that is adjacent to the current block. Only the difference between pixel values of the generated prediction block and pixel values of the current block is encoded. Intraprediction modes are roughly divided into 4×4 intraprediction modes for luminance components, 8×8 intraprediction modes, 16×16 intraprediction modes, and an intraprediction mode for chrominance components.

FIG. 1 illustrates 16×16 intraprediction modes according to the related art.

Referring to FIG. 1, there are four 16×16 intraprediction modes, i.e. a vertical mode, a horizontal mode, a direct current (DC) mode, and a plane mode.

FIG. 2 illustrates 4×4 intraprediction modes according to the prior art.

Referring to FIG. 2, there are nine 4×4 intraprediction modes, i.e. a vertical mode, a horizontal mode, a DC mode, a diagonal down-left mode, a diagonal down-right mode, a vertical right mode, a vertical left mode, a horizontal up mode, and a horizontal down mode.

Prediction mode numbers indexed to intraprediction modes are determined according to the frequency with which the intraprediction modes are used. In other words, the vertical mode indexed by 0 is most frequently used in intraprediction, and the horizontal up mode is least frequently used in intraprediction.

For example, when a 4×4 current block is prediction encoded in a mode 0, i.e. the vertical mode of FIG. 2, pixels of the 4×4 current block are predicted using pixel values of pixels A through D immediately above the 4×4 current block. In other words, the pixel value of the pixel A is predicted to be the pixel values of the four pixels of the first column of the 4×4 current block, the pixel value of the pixel B is predicted to be the pixel values of the four pixels of the second column of the 4×4 current block, the pixel value of the pixel C is predicted to be the pixel values of the four pixels of the third column of the 4×4 current block, and the pixel value of the pixel D is predicted to be the pixel values of the four pixels of the fourth column of the 4×4 current block. Next, a prediction block for the current block predicted using the pixels A through D is subtracted from the original current block, thereby generating a residual block. The residual block is encoded and inserted into a bitstream.

In video encoding according to the H.264 standard, the current macroblock is encoded in a total of 13 modes, including the 4×4 intraprediction modes and the 16×16 intraprediction modes, and a bitstream for the current block is generated in the optimal one of the 13 modes.

In intraprediction according to the related art, as illustrated in FIGS. 1 and 2, the current block is predicted using pixels that are adjacent to the current block, i.e., that are located in at least one of a position to the left of, a position above, and a position above and to the left of the current block.

However, when pixels included in the current block have no directivity as illustrated in FIGS. 1 and 2, an inaccurate prediction block is generated by intraprediction illustrated in FIGS. 1 and 2, thereby degrading the efficiency of video compression.

SUMMARY OF THE INVENTION

The present invention provides a method and apparatus for intraprediction encoding/decoding in which a current block can be intraprediction encoded/decoded using intraprediction capable of accurately predicting the current block, and a computer-readable recording medium having recorded thereon a program for executing the method.

According to one aspect of the present invention, there is provided a method of intraprediction encoding. The method includes performing image inpainting based on pixels included in a previously encoded region of a current picture among pixels that are adjacent to a boundary between a current block and the previously encoded region of the current picture, thereby predicting the current block, subtracting a prediction block generated as the prediction result from the current block, thereby generating a residual block for the current block, and encoding the generated residual block.

The predicting the current block may include performing exemplar-based image inpainting using the pixels included in the previously encoded region of the current picture among the pixels that are adjacent to the boundary between the current block and the previously encoded region of the current picture and predicting the current block based on the result of the exemplar-based image inpainting.

The exemplar-based image inpainting may include setting the boundary between the current block and the previously encoded region of the current picture as a boundary of a region to be inpainted, selecting a pixel having the highest inpainting priority from among pixels that are adjacent to the boundary of the region to be inpainted, searching in the previously encoded region of the current picture for a patch that is similar to a patch including the selected pixel, inpainting a not-yet encoded region of a macroblock based on the search result, updating the boundary of the region to be inpainted based on the inpainting result, and repeating these steps until the current block is inpainted.

The patch may have a size of 3 pixels by 3 pixels or 5 pixels by 5 pixels.

The searching for the patch may include searching for the patch that is similar to the patch comprising the selected pixel in the previous encoded region that is limited within a 32-pixel range from the boundary of the macroblock including the current block.

According to another aspect of the present invention, there is provided an apparatus for intraprediction encoding. The apparatus includes an intraprediction unit, a subtraction unit, and an encoding unit. The intraprediction unit performs image inpainting based on pixels included in a previously encoded region of a current picture among pixels that are adjacent to a boundary between a current block and the previously encoded region of the current picture, thereby predicting the current block. The subtraction unit subtracts a prediction block generated as the prediction result from the current block, thereby generating a residual block for the current block. The encoding unit encodes the generated residual block.

According to another aspect of the present invention, there is provided a method of intraprediction decoding. The method includes decoding a residual block for the current block, performing image inpainting based on pixels included in a previously decoded region of a current picture among pixels that are adjacent to a boundary between a current block and the previously decoded region of the current picture, thereby predicting the current block, and adding a prediction block generated as the prediction result to the residual block, thereby reconstructing the current block.

The prediction of the current block may include performing exemplar-based image inpainting using the pixels included in the previously decoded region of the current picture among the pixels that are adjacent to the boundary between the current block and the previously decoded region of the current picture and predicting the current block based on the result of the exemplar-based image inpainting.

According to another aspect of the present invention, there is provided an apparatus for intraprediction decoding. The apparatus includes a decoding unit, an intraprediction unit, and an addition unit. The decoding unit decodes a residual block for a current block. The intraprediction unit performs image inpainting based on pixels included in a previously decoded region of a current picture among pixels that are adjacent to a boundary between a current block and the previously decoded region of the current picture, thereby predicting the current block. The addition unit adds a prediction block generated as the prediction result to the residual block, thereby reconstructing the current block.

According to another aspect of the present invention, there is provided a computer-readable recording medium having recorded thereon a program for executing the method of intraprediction encoding/decoding.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
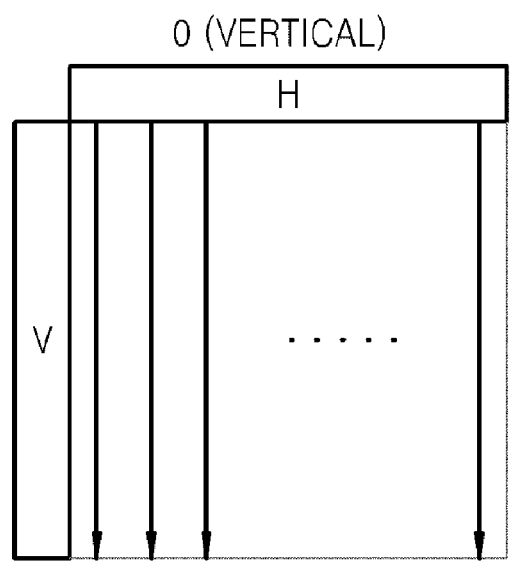
FIG. 1 illustrates 16×16 intraprediction modes according to the related art.
Figure 1:
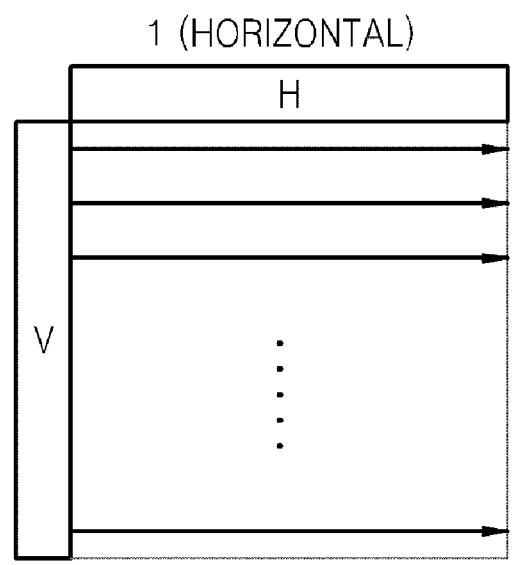
Figure 1:
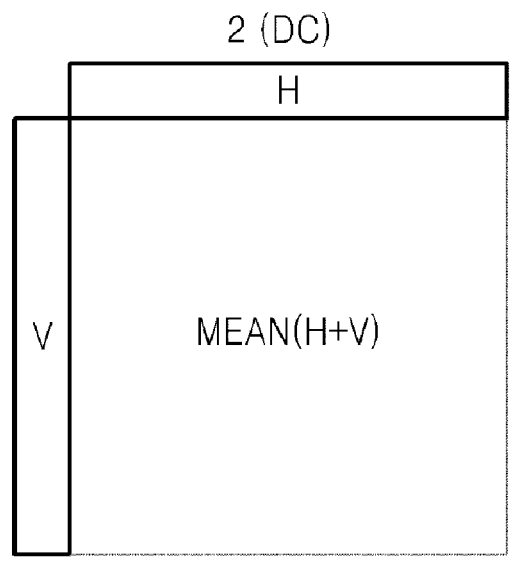
Figure 1:
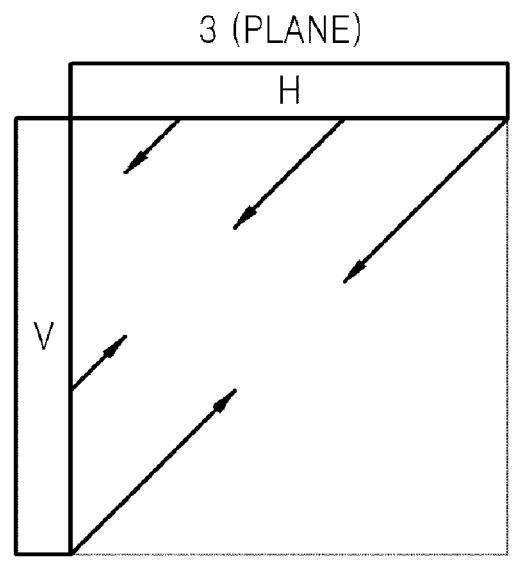

Hereinafter, exemplary embodiments of the present invention will be described in detail with reference to the accompanying drawings. It should be noted that like reference numerals refer to like elements illustrated in one or more of the drawings. In the following description of the present invention, detailed description of known functions and configurations incorporated herein will be omitted for conciseness and clarity.

Figure 3:
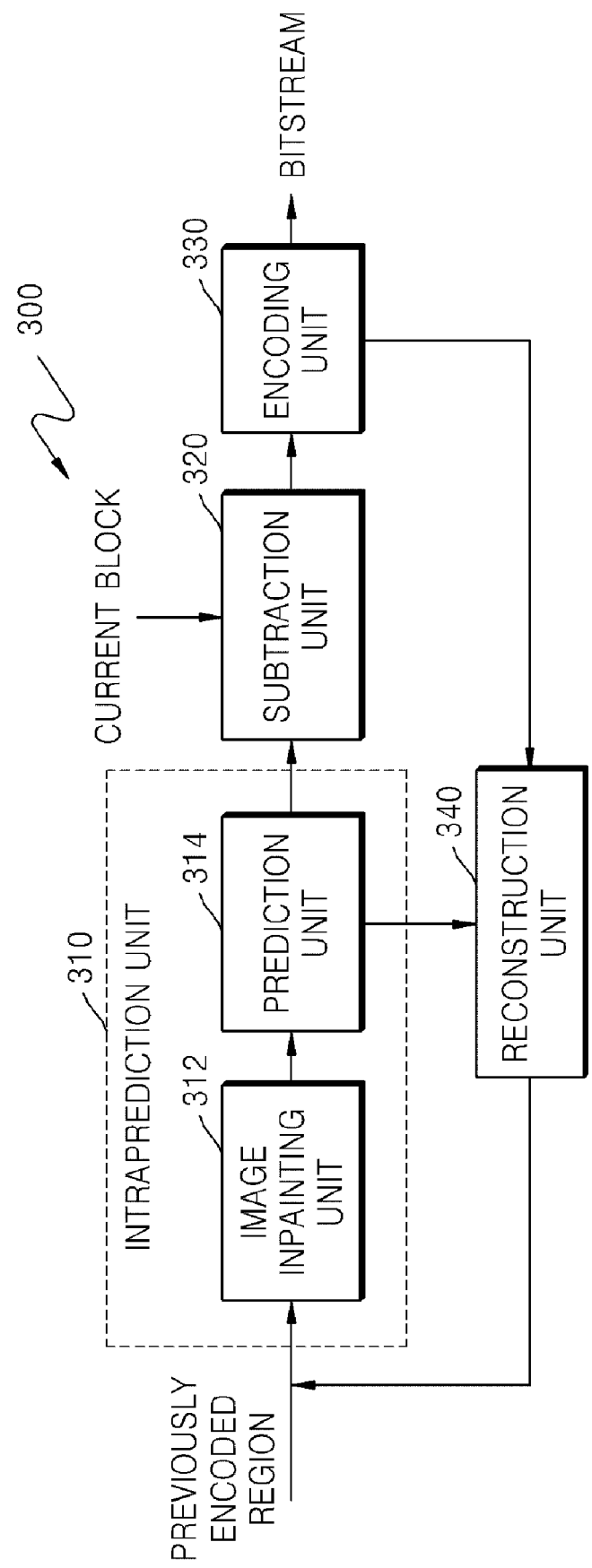
FIG. 3 is a block diagram of a video encoder according to an exemplary embodiment of the present invention.

FIG. 3 is a block diagram of a video encoder 300 according to an exemplary embodiment of the present invention.

Referring to FIG. 3, the video encoder 300 according to an exemplary embodiment of the present invention includes an intraprediction unit 310, a subtraction unit 320, an encoding unit 330, and a reconstruction unit 340.

Figure 2:
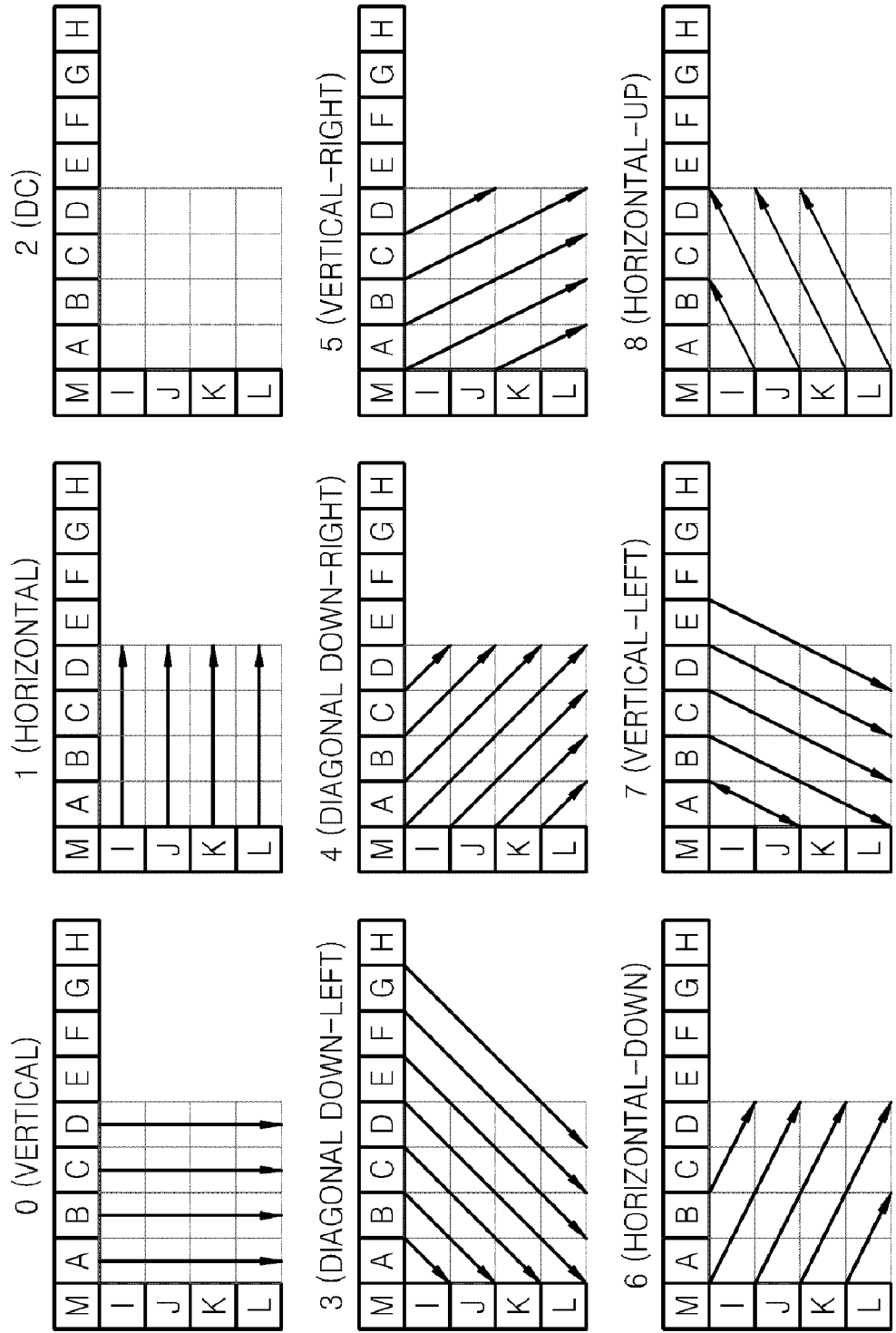
FIG. 2 illustrates 4×4 intraprediction modes according to the related art.

The intraprediction unit 310 generates a prediction block for a current block using spatial redundancy in the current picture. The intraprediction unit 310 provides a new prediction mode in addition to intra directional prediction that has been described with reference to FIGS. 1 and 2. Image inpainting is performed based on pixels included in an encoded region among pixels that are adjacent to a boundary between the current block and a previously encoded region of the current picture, thereby predicting the current block.

Figure 4:
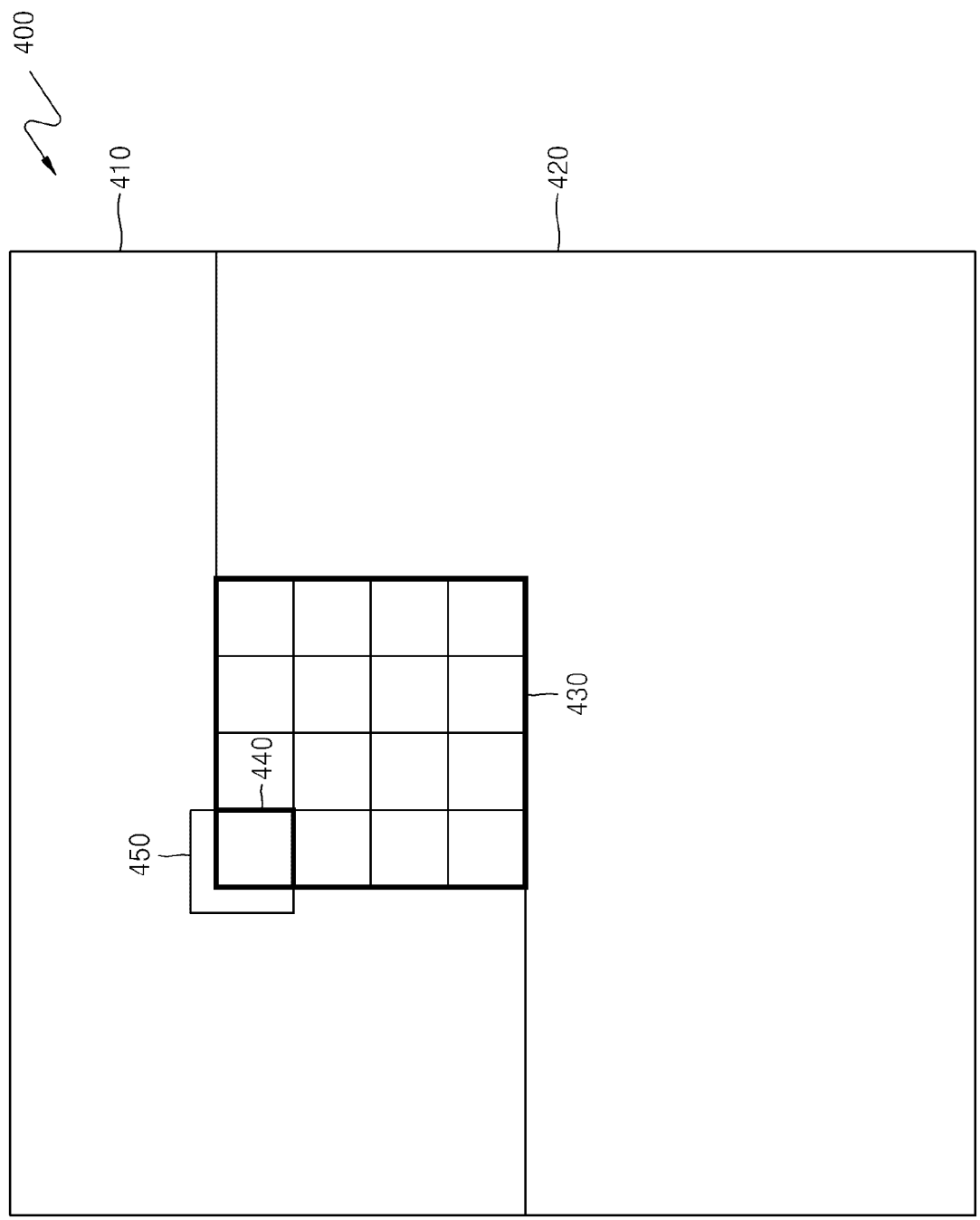
FIG. 4 is a diagram for explaining intraprediction according to an exemplary embodiment of the present invention.

The intraprediction unit 310 may include an image inpainting unit 312 and a prediction unit 314, as will be described in detail with reference to FIG. 4. FIG. 4 is a diagram for explaining intraprediction according to an exemplary embodiment of the present invention Referring to FIG. 4, the image inpainting unit 312 performs image inpainting using pixels that are adjacent to a boundary between a current block 440 and a previously encoded region 410 of a current picture 400. Preferably, the image inpainting unit 312 performs image inpainting using pixels 450 included in the previously encoded region 410 adjacent to the boundary of the current block 440. In the following description, intraprediction will be described on the assumption that the current block 440 is a 4×4 block and a macroblock 430 including the current block 440 is a 16×16 block.

The boundary between the current block 440 and the previously encoded region 410 of the current picture 400 is set as the initial boundary of a region to be inpainted or an inpainting region, and image inpainting is performed using the pixels 450 included in the previously encoded region 410 among pixels that are adjacent to the initial boundary.

For image inpainting, it is desirable to perform exemplar-based image inpainting that is to be described below with reference to FIGS. 5A through 5E.

FIGS. 5A through 5E are diagrams for explaining image inpainting with reference to FIG. 4, according to an exemplary embodiment of the present invention.

Figure 5A:
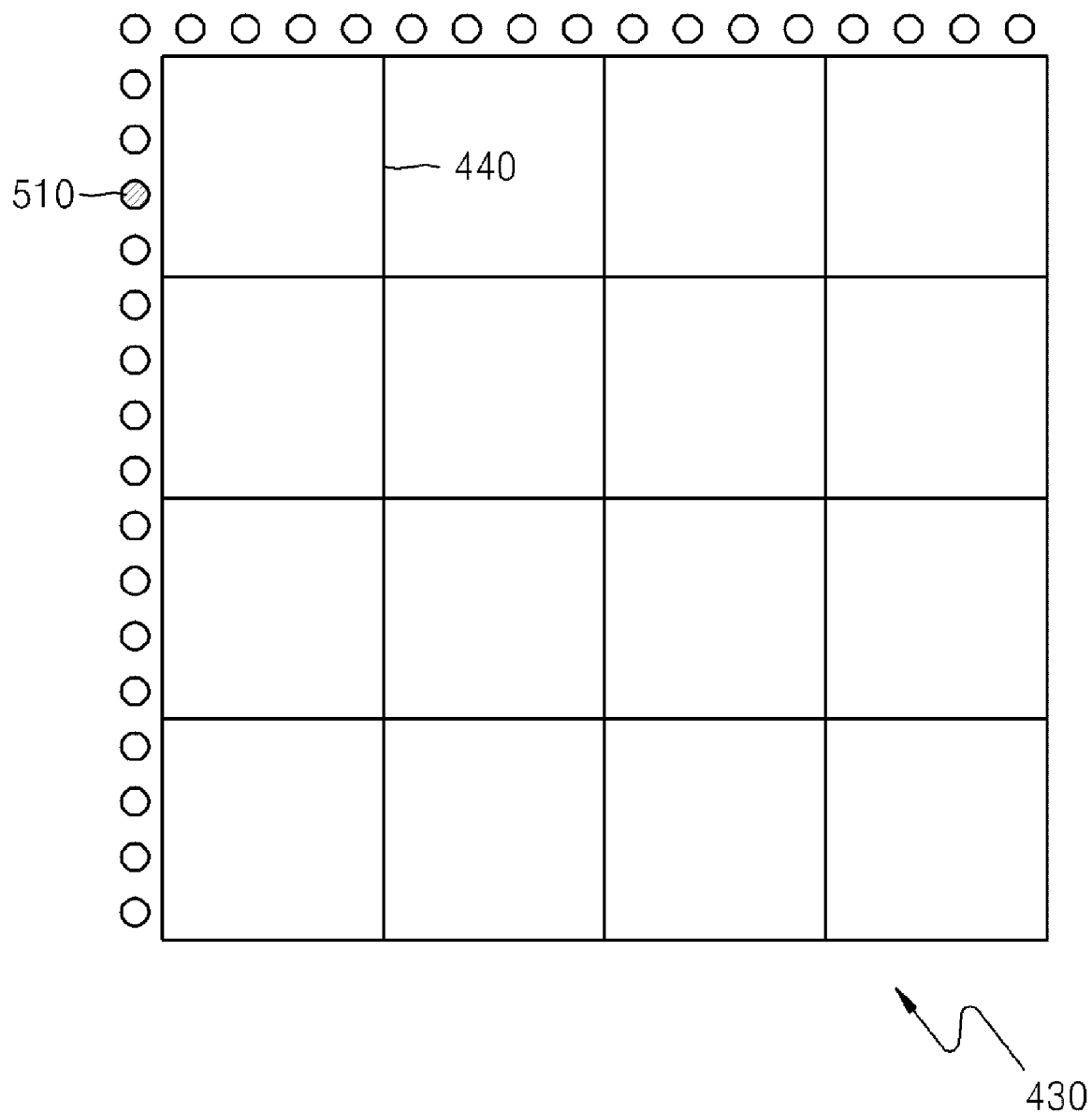
FIGS. 5A through 5E are diagrams for explaining image inpainting according to an exemplary embodiment of the present invention.

Referring to FIG. 5A, exemplar-based image inpainting is performed based on the pixels 450 included in the previously encoded region 410 among pixels that are adjacent to the boundary between the current block 440 and the previously encoded region 410 in order to predict the current block 440.

First, a pixel 510 having the highest inpainting priority is selected from among the pixels that are adjacent to the boundary between the current block 440 and the previously encoded region 410 of the current picture 400. Although a method of selecting a pixel having the highest inpainting priority is not limited, it is desirable to calculate an inpainting priority based on an angle between the boundary of the inpainting region and an edge direction at each pixel.

Figure 5B:
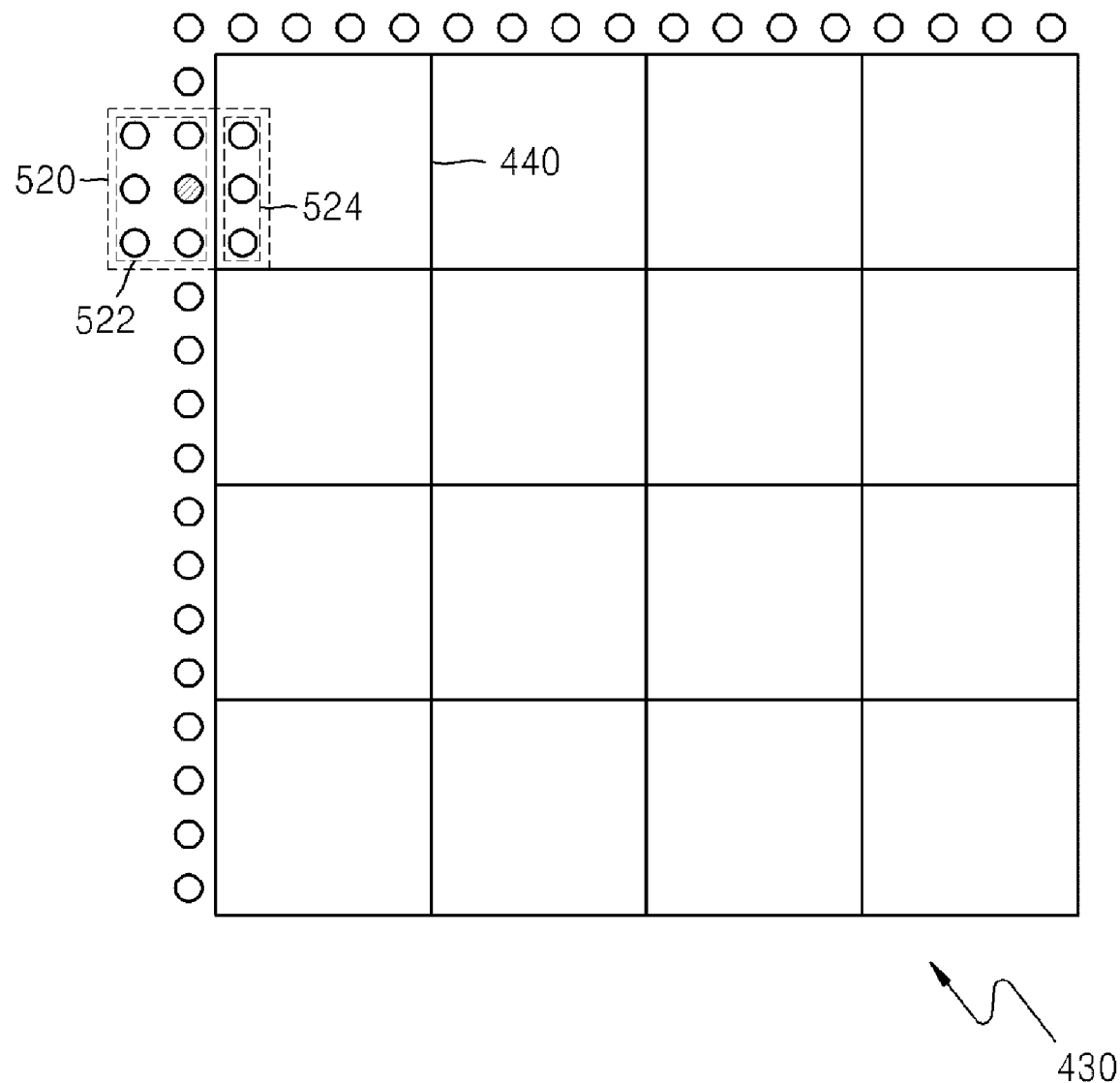

Upon selection of the pixel 510 having the highest inpainting priority, a patch 520 including the selected pixel 510 and pixels that are adjacent to the selected pixel 510 is set as illustrated in FIG. 5B. The patch 520 is an image inpainting unit, and image painting may be performed using image inpainting units of various sizes such as 3×3 and 5×5. In the following description, it is assumed that the patch 520 has a size of 3×3.

After the patch 520 is set around the pixel 510 having the highest inpainting priority, a patch that is most similar to the patch 520 is searched for in the previously encoded region 410 of the current picture 400 using pixels 522 included in the previously encoded region 410 among pixels included in the patch 520. For example, the most similar patch may be found by searching for a patch having the smallest sum of absolute difference (SAD) with the pixels 522 included in the previously encoded region 410.

Once the most similar patch is found, a portion of the found patch is copied to the patch 520, thereby performing image inpainting. In FIG. 5B, the values of pixels included in the right-most column of the found similar patch among pixels included in the found similar patch serve as the values of pixels 524 included in a not-yet encoded region of the patch 520.

Figure 5C:
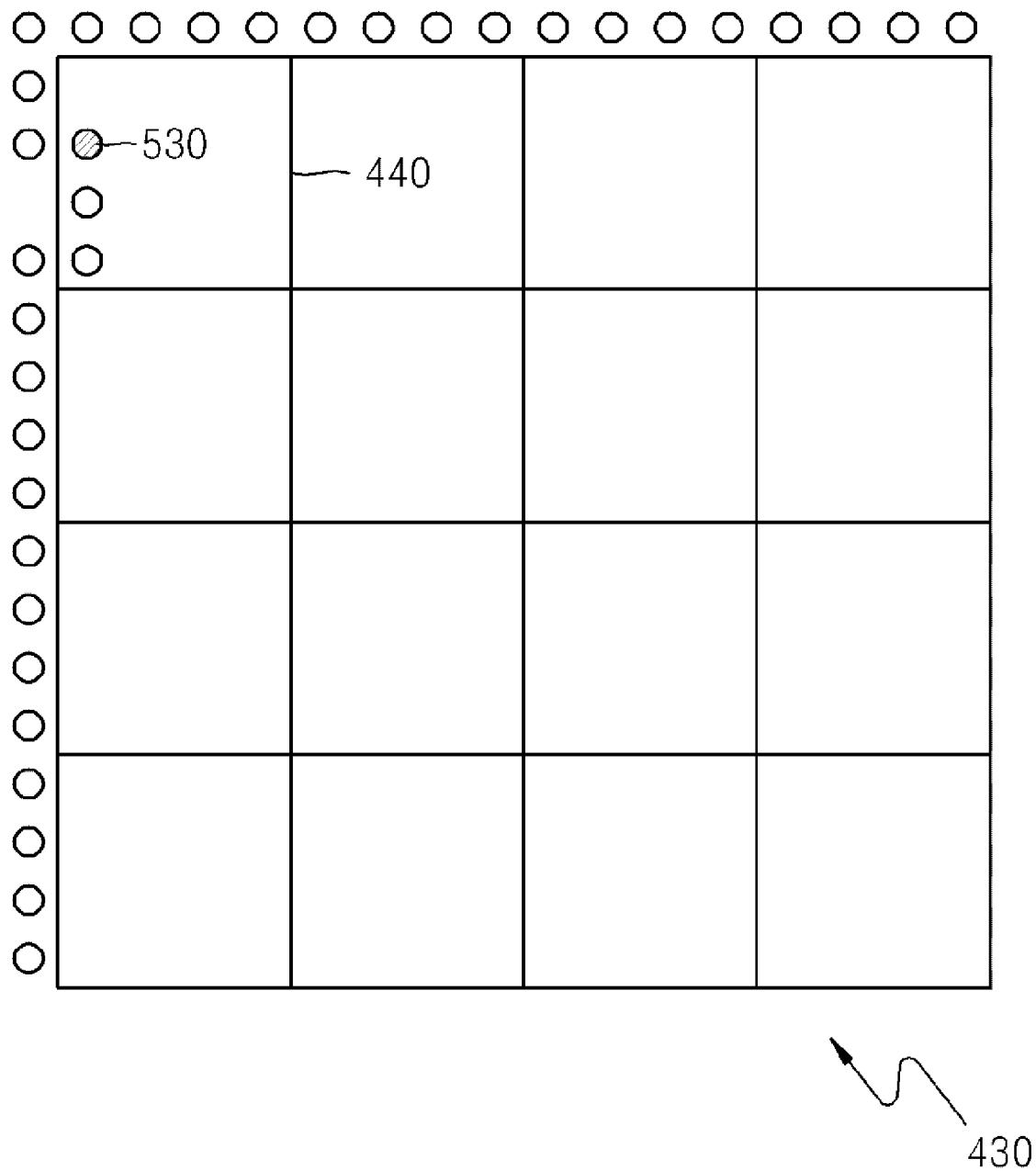

After completion of first image inpainting, the boundary of the inpainting region is updated based on inpainted pixels as illustrated in FIG. 5C. A pixel 530 having the highest inpainting priority is selected again in the updated boundary.

Figure 5D:
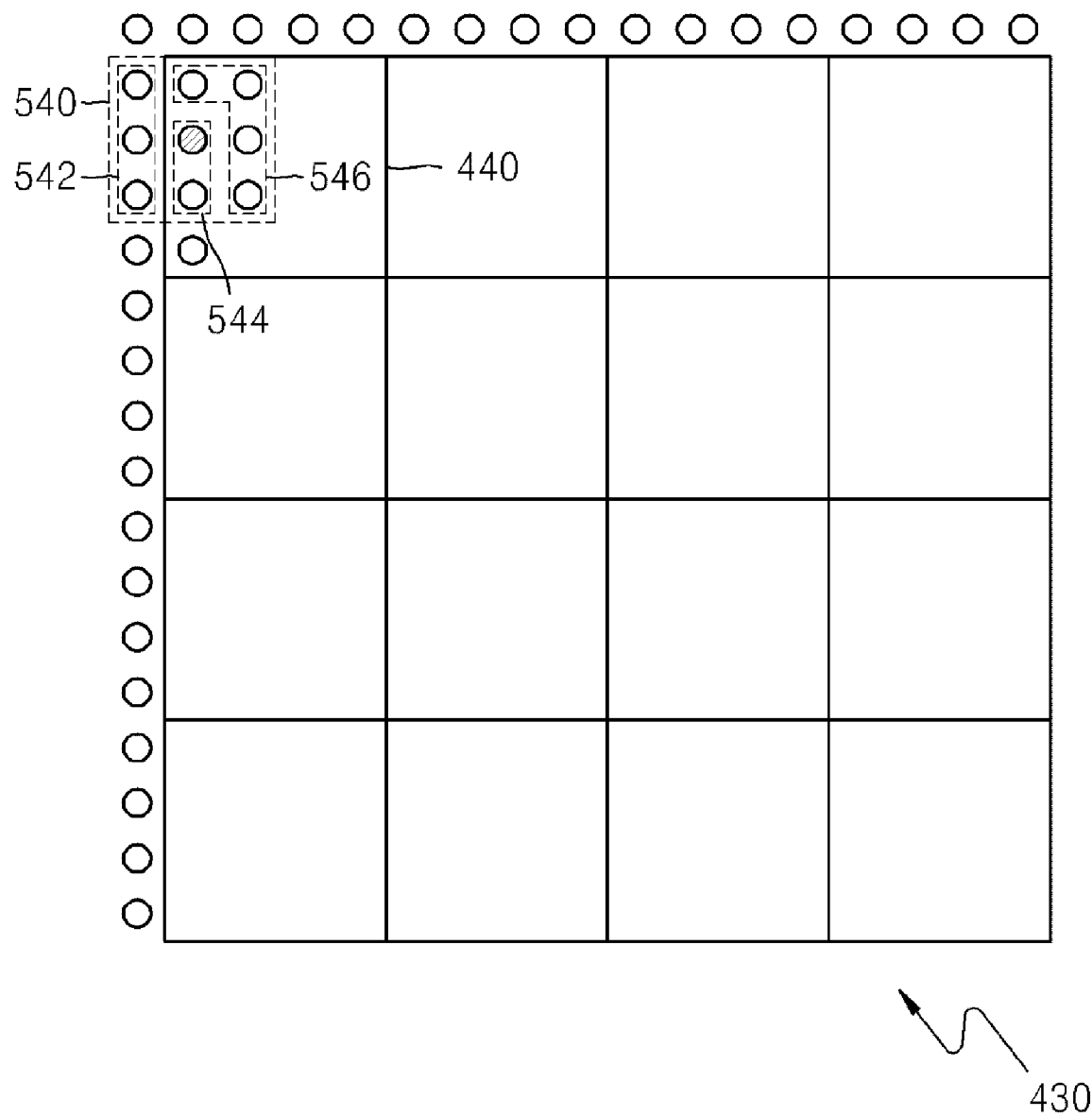

Next, a patch 540 is set around the selected pixel 530 as illustrated in FIG. 5D. A patch that is most similar to the patch 540 is searched for in the previously encoded region 410 using pixels 542 included in the previously encoded region 410 and pixels 544 included in a previously inpainted region among pixels included in the patch 540. The values of pixels 546 included in the remaining region of the patch 540 are inpainted according to the search result.

Figure 5E:
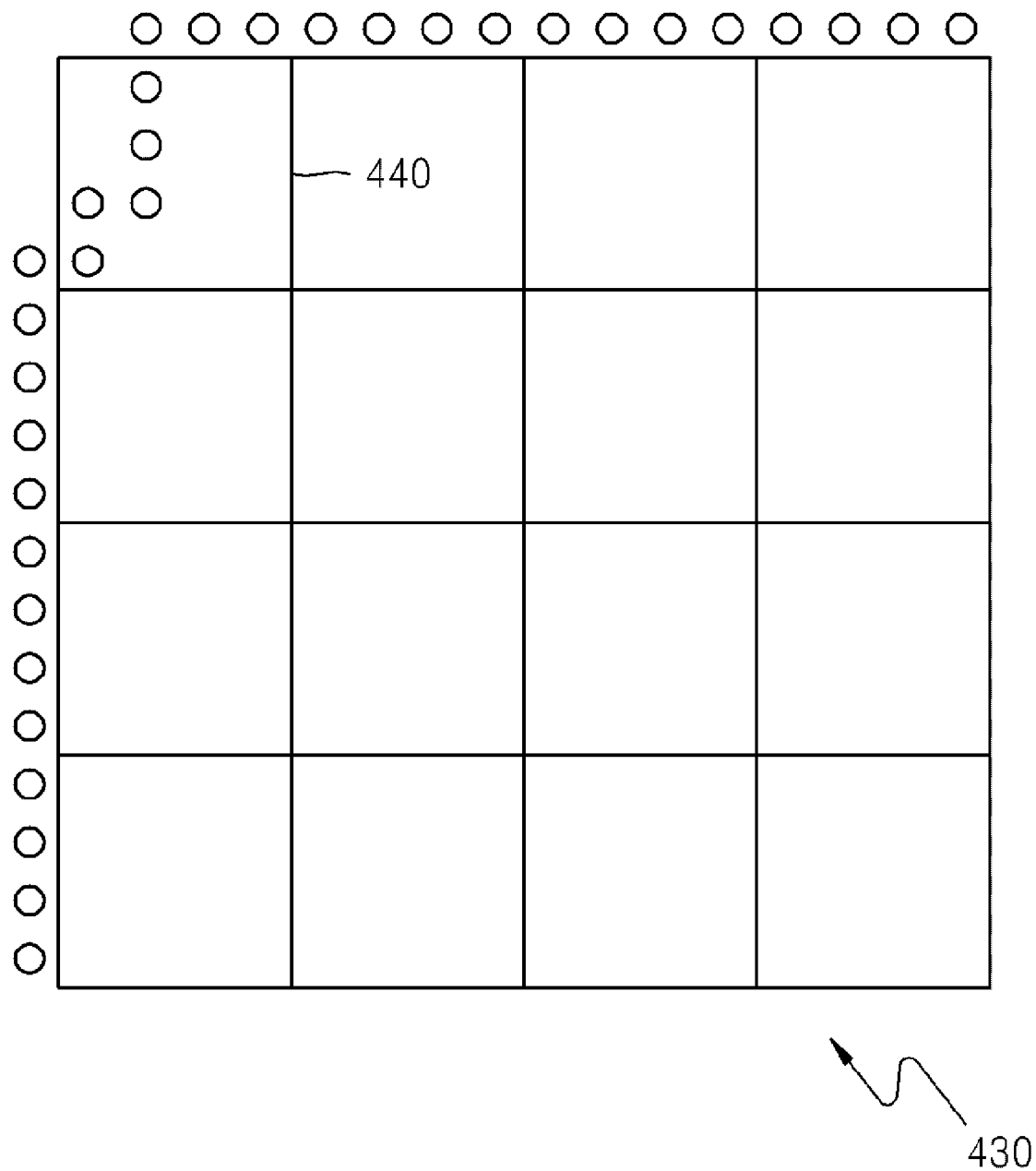

After completion of second image inpainting, the boundary of the inpainting region is updated again as illustrated in FIG. 5E. Image inpainting is repeated until all pixels included in the current block 440 are inpainted.

To speed up the inpainting process, the number of pixels inpainted at a time may be increased by increasing the size of a patch. In addition, the previously encoded region 410 of the current picture 400 which is searched using the set patch 520 or 540 may be limited.

Figure 6:
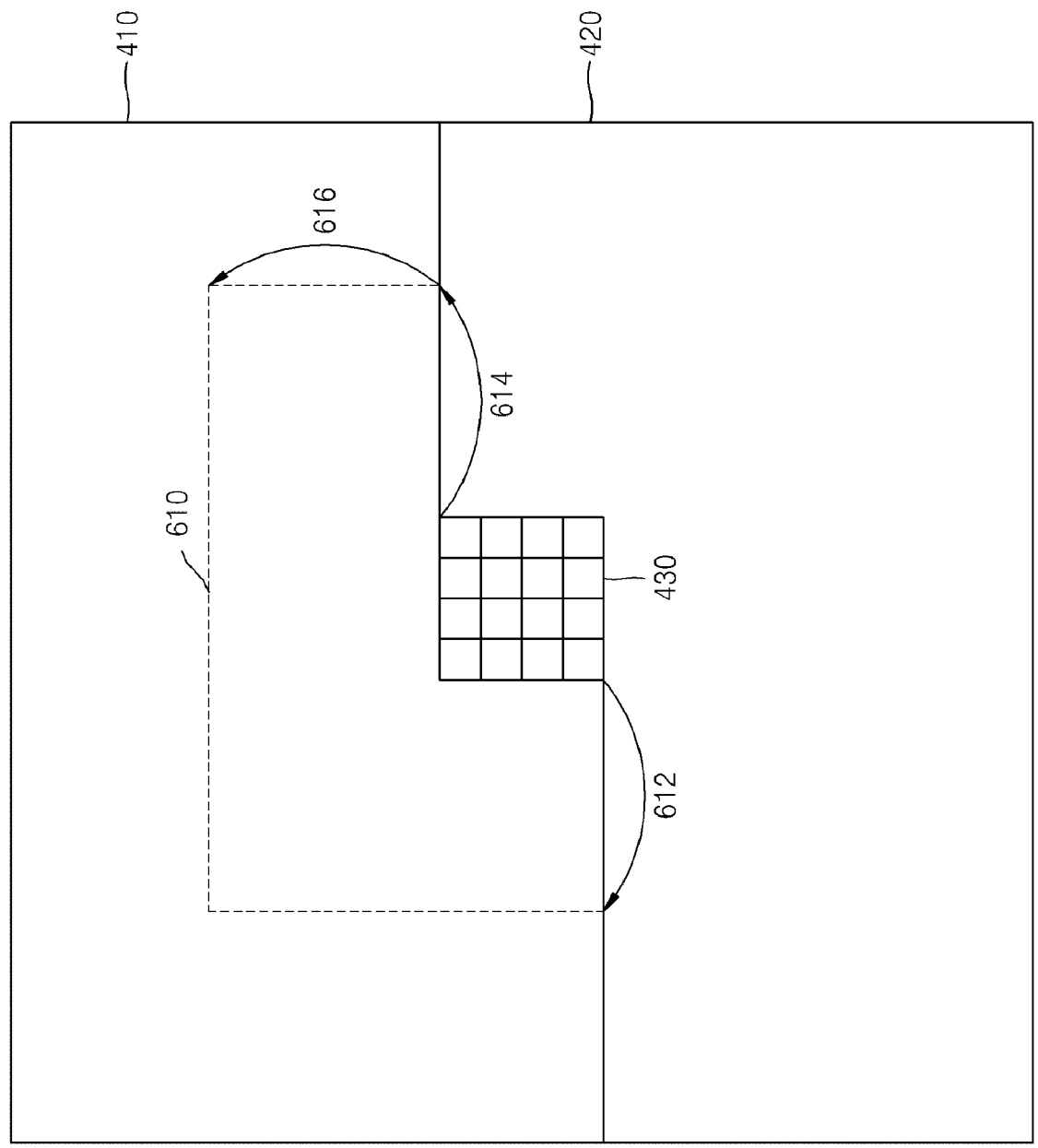
FIG. 6 is a diagram illustrating a search region for image inpainting according to an exemplary embodiment of the present invention.

FIG. 6 is a diagram illustrating a search region for image inpainting according to an exemplary embodiment of the present invention.

When the previously encoded region 410 is searched using pixels included in the set patch 520 or 540 as described with reference to FIGS. 5B and 5D, only a portion of the previously encoded region 410 may be searched.

More specifically, a search region is set to be limited around the macroblock 430, and searching is performed only in the limited search region. For example, the search region may be limited to a region 610 having a boundary located 32 pixels in a left direction 612 from a left boundary of the macroblock 430, 32 pixels in a right direction 614 from a right boundary the boundary of the macroblock 430, and 32 pixels in an upper direction 616 from an upper boundary of the macroblock 430.

Referring back to FIG. 3, after the image inpainting unit 312 inpaints all pixels included in the current block 440, the prediction unit 314 predicts the current block 440 based on the inpainting result of the image inpainting unit 312. Preferably, the prediction unit 314 predicts an inpainted block obtained by the image inpainting unit 312 as a prediction block for the current block 440.

The subtraction unit 320 subtracts the prediction block generated in the intraprediction unit 310 from the current block 440, thereby generating a residual block.

The encoding unit 330 encodes the residual block generated by the subtraction unit 320. The encoding unit 330 also performs a discrete cosine transformation (DCT) on the residual block in order to generate a DCT coefficient and quantizes the generated DCT coefficient. The encoding unit 330 then encodes the quantized DCT coefficient and inserts the encoded DCT coefficient into a bitstream.

The reconstruction unit 340 performs inverse quantization and inverse DCT on the quantized DCT coefficient, thereby reconstructing the residual block. The reconstructed residual block is added to the prediction block generated by the prediction unit 314, thereby being reconstructed as the current block 440. The reconstructed current block 440 is used for prediction of a next block 442, as will be described in detail with reference to FIGS. 7A through 7C.

Figure 7A:
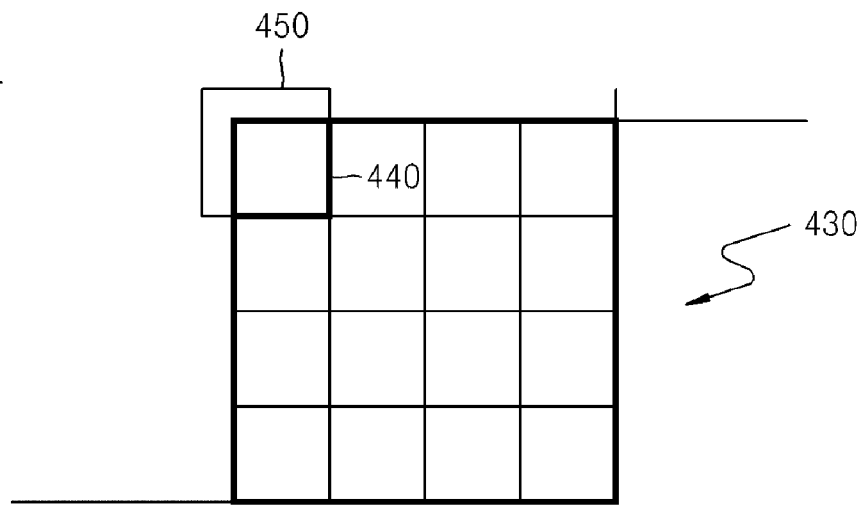
FIGS. 7A through 7C are diagrams illustrating a process in which the boundary of an inpainting region changes according to an exemplary embodiment of the present invention.
Figure 7B:
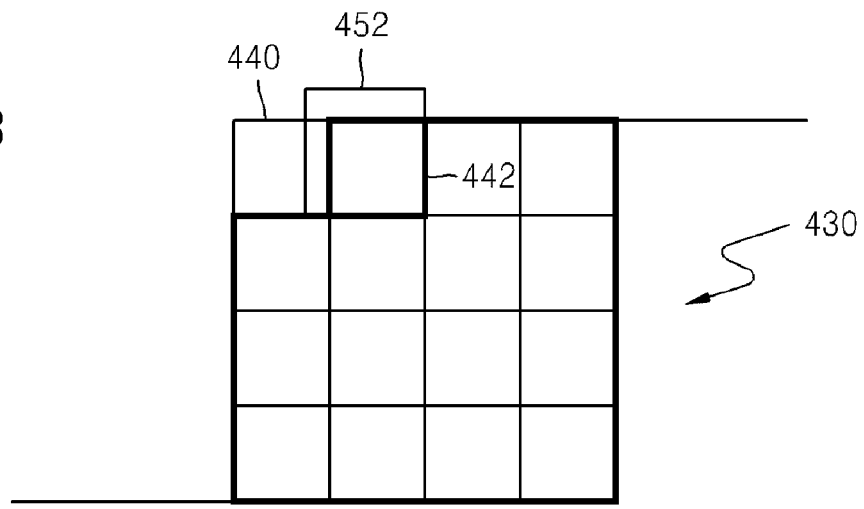
Figure 7C:
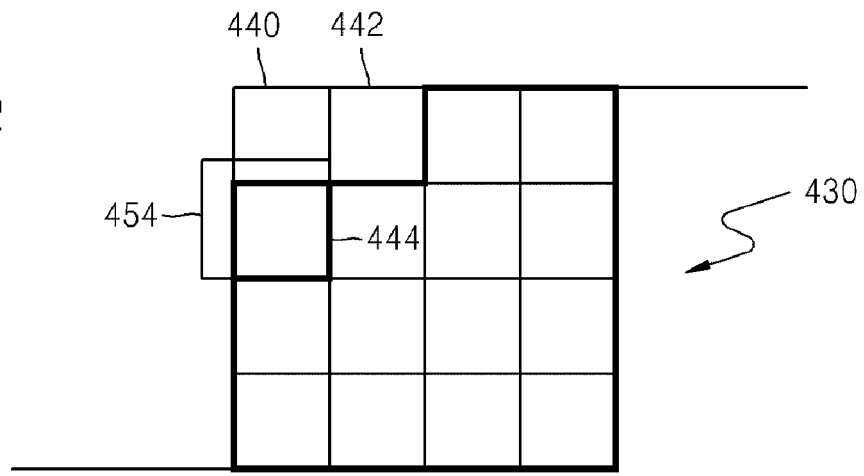

FIGS. 7A through 7C are diagrams illustrating a process in which the boundary of an inpainting region changes according to an exemplary embodiment of the present invention.

Referring to FIG. 7A, an initial boundary between a block 440 and the pixels 450 included in the previously encoded region of an inpainting region for performing image inpainting in order to predict a block 440 included in a macroblock 430 is illustrated. However, referring to FIG. 7B, a block 442 that is adjacent to the right of the block 440 is prediction encoded after encoding of the block 440 is finished. Thus, the current block 440 has to be included in the previously encoded region 410 when the block 442 adjacent to the right of the block 440 is predicted.

As a result, when image inpainting is performed in order to predict the block 442 that is adjacent to the right of the block 440, an initial boundary between the block 442 and the pixels 452 is as illustrated in FIG. 7B. Referring to FIG. 7B, the initial boundary of the inpainting region is set to include the boundary of the macroblock 430 and the boundary of the block 442. Image inpainting described with reference to FIGS. 5A through 5E are repeated using pixels 452 that are adjacent to the initial boundary of the inpainting region until the block 442 that is adjacent to the right of the block 440 is inpainted.

After prediction encoding of the block 442 is completed, a block 444 that is adjacent below the current block 440 is prediction encoded. Like in the case of the block 442 that is adjacent to the right of the current block 440, the block 444 adjacent below the current block 440 is prediction encoded after encoding of the current block 440 is finished. Thus, when the block 444 that is adjacent below the current block 440 is predicted, an initial boundary is between the block 444 and the pixels 454.

Figure 8:
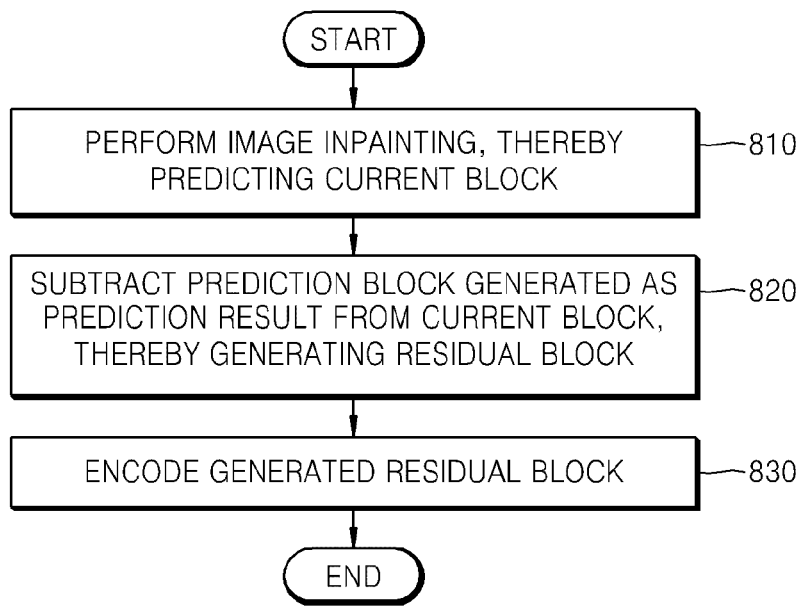
FIG. 8 is a flowchart illustrating a video encoding method according to an exemplary embodiment of the present invention.

FIG. 8 is a flowchart illustrating a video encoding method according to an exemplary embodiment of the present invention.

Referring to FIG. 8, the video encoder 300 according to an exemplary embodiment of the present invention performs image inpainting based on pixels that are adjacent to a boundary between a current block and a previously encoded region of a current picture, thereby generating a prediction block for the current block, in operation 810.

Preferably, the video encoder 300 sets the boundary between the current block and a previously encoded region of the current picture as an initial boundary of an inpainting region and performs exemplar-based image inpainting described with reference to FIGS. 5A through 5E.

In operation 820, the video encoder 300 subtracts the prediction block generated in operation 810 as the prediction result from the current block, thereby generating a residual block for the current block.

In operation 830, the video encoder 300 encodes the residual block generated in operation 820. To this end, the video encoder 300 performs DCT on the residual block in order to generate a DCT coefficient and quantizes the generated DCT coefficient. The video encoder 300 then performs entropy-encoding on the quantized coefficient and inserts the encoded coefficient into a bitstream.

Figure 9:
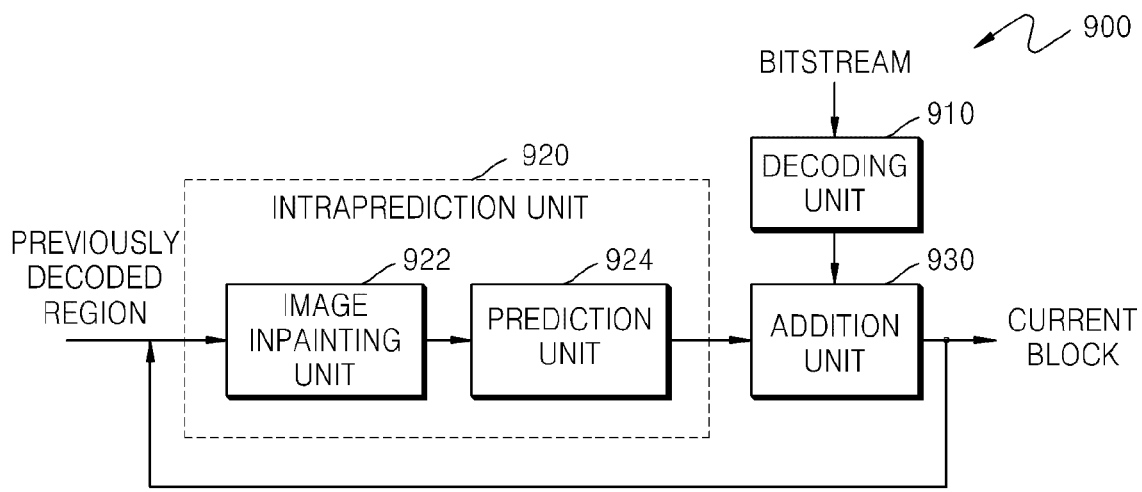
FIG. 9 is a block diagram of a video decoder according to an exemplary embodiment of the present invention.

FIG. 9 is a block diagram of a video decoder 900 according to an exemplary embodiment of the present invention.

Referring to FIG. 9, the video decoder 900 according to an exemplary embodiment of the present invention includes a decoding unit 910, an intraprediction unit 920, and an addition unit 930.

The decoding unit 910 decodes a residual block for the current block. To this end, the decoding unit 910 receives data for the residual block and performs entropy-decoding on the received data. The decoding unit 910 performs inverse quantization on a quantized DCT coefficient of the residual block generated as the entropy-decoding result. The decoding unit 910 performs inverse DCT on the inversely quantized DCT coefficient, thereby decoding the residual block.

Like the intraprediction unit 310 of the video encoder 300, the intraprediction unit 920 performs intraprediction in a new prediction mode according to an exemplary embodiment of the present invention, thereby generating a prediction block for the current block. More specifically, the intraprediction unit 920 performs image inpainting based on pixels included in a previously decoded region among pixels that are adjacent to a boundary between the current block and a previously encoded region of the current picture, thereby predicting the current block.

The intraprediction unit 920 may include an image inpainting unit 922 and a prediction unit 924.

The image inpainting unit 922 performs image inpainting using the pixels that are adjacent to the boundary between the current block and the previously encoded region of the current picture. As mentioned above, the image inpainting unit 922 may perform image inpainting using exemplar-based image inpainting.

As previously described with reference to FIGS. 5A through 5E, the image inpainting unit 922 sets the boundary between the current block and the previously encoded region of the current picture as an initial boundary of an inpainting region and repeats exemplar-based image inpainting, thereby inpainting the current block.

The prediction unit 924 generates the prediction block for the current block based on the prediction result obtained by the image inpainting unit 922.

The addition unit 930 adds the prediction block generated in the intraprediction unit 920 to the residual block decoded by the decoding unit 910, thereby reconstructing the current block. The reconstructed current block is transmitted to the intraprediction unit 920 in order to be used for intraprediction of a next block.

Figure 10:
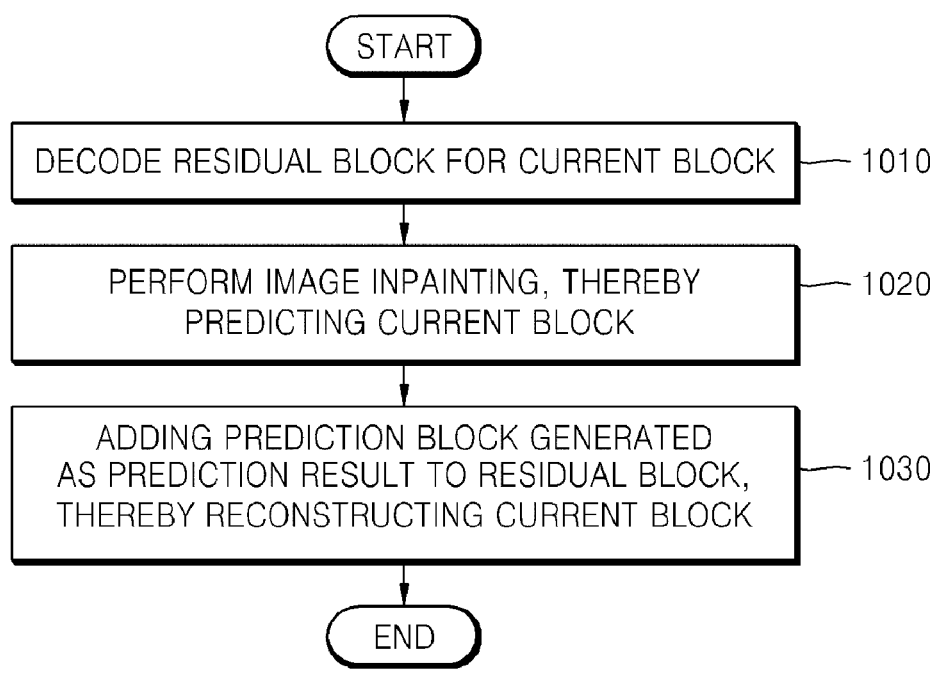
FIG. 10 is a flowchart illustrating a video decoding method according to an exemplary embodiment of the present invention.

FIG. 10 is a flowchart illustrating a video decoding method according to an exemplary embodiment of the present invention.

Referring to FIG. 10, the video decoder 900 according to an exemplary embodiment of the present invention decodes a residual block for the current block in operation 1010. To this end, the video decoder 900 performs entropy-decoding, inverse quantization, and inverse DCT on data for the residual block, thereby reconstructing the residual block.

In operation 1020, the video decoder 900 performs image inpainting based on pixels that are adjacent to a boundary between a previously decoded region of the current picture and a not-yet decoded region of the current picture, thereby predicting the current block.

Preferably, the video decoder 900 performs exemplar-based image inpainting based on pixels that are adjacent to a boundary between the current block and the previously encoded region of the current picture. Intraprediction described in relation to video encoding is symmetrically used in video decoding.

In operation 1030, the video encoder 900 adds the residual block decoded in operation 1010 to the prediction block generated in operation 1020, thereby reconstructing the current block.

The present invention can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion.

According to the present invention, by providing an additional intraprediction mode that allows the use of spatial redundancy in a picture, a current block of a macroblock can be accurately intrapredicted, thereby improving the compression efficiency of video encoding.

While the present invention has been particularly shown and described with reference to an exemplary embodiment thereof, it will be understood by those of ordinary skill in the art that various changes in form and detail may be made therein without departing from the spirit and scope of the present invention as defined by the following claims.

What is claimed is:

1. A method of intraprediction encoding, comprising:
   performing image inpainting based on pixels included in a previously encoded region of a current picture among pixels that are adjacent to a boundary between a current block and the previously encoded region of the current picture;
   setting values of image-inpainted pixels obtained by the performing of the image inpainting as prediction values of a prediction block of the current block;
   subtracting the prediction block from the current block, to generate a residual block for the current block; and
   encoding the generated residual block.

2. The method of claim 1, wherein the performing the image inpainting comprises performing exemplar-based image inpainting using the pixels included in the previously encoded region of the current picture among the pixels that are adjacent to the boundary between the current block and the previously encoded region of the current picture, and wherein the setting comprises setting the prediction values of the prediction block based on a result of the exemplar-based image inpainting.

3. A method of intraprediction encoding, comprising:
performing image inpainting based on pixels included in a previously encoded region of a current picture among pixels that are adjacent to a boundary between a current block and the previously encoded region of the current picture to generate a prediction block of the current block;
subtracting the prediction block from the current block, to generate a residual block for the current block; and
encoding the generated residual block,
wherein the performing the image inpainting comprises:
performing exemplar-based image inpainting using the pixels included in the previously encoded region of the current picture among the pixels that are adjacent to the boundary between the current block and the previously encoded region of the current picture; and
generating the prediction block based on a result of the exemplar-based image inpainting, and
wherein the performing of the exemplar-based image inpainting comprises:
a) setting the boundary between the current block and the previously encoded region of the current picture as a boundary of a region to be inpainted;
b) selecting a pixel having a highest inpainting priority from among pixels that are adjacent to the boundary of the region to be inpainted;
c) searching in the previously encoded region of the current picture for a patch that is similar to a patch including the selected pixel, and generating a search result;
d) inpainting a not-yet encoded region of a macroblock based on the search result;
e) updating the boundary of the region to be inpainted based on an inpainting result of operation d); and
f) repeating operations b) through e) until the current block is inpainted.

4. The method of claim 3, wherein the patch has a size of 3 pixels by 3 pixels or 5 pixels by 5 pixels.

5. The method of claim 3, wherein the searching for the patch comprises searching for the patch that is similar to the patch comprising the selected pixel in the previous encoded region that is limited within a 32-pixel range from the boundary of the macroblock including the current block.

6. An apparatus for intraprediction encoding, comprising:
an intraprediction unit that performs image inpainting based on pixels included in a previously encoded region of a current picture among pixels that are adjacent to a boundary between a current block and the previously encoded region of the current picture and sets the values of image-inpainted pixels obtained by the image inpainting as prediction values of a prediction block of the current block;
a subtraction unit that subtracts the prediction block from the current block, to generate a residual block for the current block; and
an encoding unit that encodes the generated residual block.

7. The apparatus of claim 6, wherein the intraprediction unit comprises:
an image inpainting unit that performs exemplar-based image inpainting using the pixels included in the previously encoded region of the current picture among the pixels that are adjacent to the boundary between the current block and the previously encoded region of the current picture; and
a prediction unit that sets the values of the prediction block based on a result of the exemplar-based image inpainting.

8. A method of intraprediction decoding, comprising:
decoding a residual block for a current block;
performing image inpainting based on pixels included in a previously decoded region of a current picture among pixels that are adjacent to a boundary between the current block and the previously decoded region of the current picture;
setting values of image-inpainted pixels obtained by the performing of the image inpainting as values of a prediction block of the current block; and
adding the prediction block to the residual block, to reconstruct the current block.

9. The method of claim 8, wherein the performing the image inpainting comprises performing exemplar-based image inpainting using the pixels included in the previously decoded region of the current picture among the pixels that are adjacent to the boundary between the current block and the previously decoded region of the current picture, and wherein the setting comprises setting the values of the prediction block based on a result of the exemplar-based image inpainting.

10. A method of intraprediction decoding, comprising:
decoding a residual block for a current block;
performing image inpainting based on pixels included in a previously decoded region of a current picture among pixels that are adjacent to a boundary between the current block and the previously decoded region of the current picture to generate a prediction block of the current block; and
adding the prediction block to the residual block, to reconstruct the current block,
wherein the performing the image inpainting comprises:
performing exemplar-based image inpainting using the pixels included in the previously decoded region of the current picture among the pixels that are adjacent to the boundary between the current block and the previously decoded region of the current picture; and
generating the prediction block based on a result of the exemplar-based image inpainting, and
wherein the performing of the exemplar-based image inpainting comprises:
a) setting the boundary between the current block and the previously decoded region of the current picture as a boundary of a region to be inpainted;
b) selecting a pixel having a highest inpainting priority from among pixels that are adjacent to the boundary of the region to be inpainted;
c) searching in the previously decoded region of the current picture for a patch that is similar to a patch comprising the selected pixel, and generating a search result;
d) inpainting a not-yet decoded region of a macroblock based on the search result;
e) updating the boundary of the region to be inpainted based on an inpainting result of operation d); and f) repeating operations b) through e) until the current block is inpainted.

11. The method of claim 10, wherein the patch has a size of 3 pixels by 3 pixels or 5 pixels by 5 pixels.

12. The method of claim 10, wherein the searching for the patch comprises searching for the patch that is similar to the patch comprising the selected pixel in the previous decoded region that is limited within a 32-pixel range from the boundary of the macroblock comprising the current block.

13. An apparatus for intraprediction decoding, comprising:
a decoding unit that decodes a residual block for a current block;
an intraprediction unit that performs image inpainting based on pixels included in a previously decoded region of a current picture among pixels that are adjacent to a boundary between the current block and the previously decoded region of the current picture and sets values of image-inpainted pixels obtained by the image inpainting as prediction values of a prediction block of the current block; and
an addition unit that adds the prediction block to the residual block, to reconstruct the current block.

14. The apparatus of claim 13, wherein the intraprediction unit comprises:
an image inpainting unit that performs exemplar-based image inpainting using the pixels included in the previously decoded region of the current picture among the pixels that are adjacent to the boundary between the current block and the previously decoded region of the current picture; and
a prediction unit that sets the prediction values of the prediction block based on a result of the exemplar-based image inpainting.

15. A non-transitory computer-readable recording medium having recorded thereon a program for executing a method of intraprediction encoding, comprising:
performing image inpainting based on pixels included in a previously encoded region of a current picture among pixels that are adjacent to a boundary between a current block and the previously encoded region of the current picture;
setting values of image-inpainted pixels as prediction values of a prediction block of the current block;
subtracting the prediction block from the current block to generate a residual block for the current block; and
encoding the generated residual block.

16. A non-transitory computer-readable recording medium having recorded thereon a program for executing a method of intraprediction decoding, comprising:
decoding a residual block for a current block;
performing image inpainting based on pixels included in a previously decoded region of a current picture among pixels that are adjacent to a boundary between the current block and the previously decoded region of the current picture;
setting values of image-inpainted pixels obtained by the performing of the image inpainting as values of a prediction block of the current block; and
adding the prediction block to the residual block, to reconstruct the current block.

17. An intraprediction method, comprising:
selecting, from among pixels that are adjacent to pixels of a current block and encoded prior to the pixels of the current block, an inpainting pixel;
determining an inpainting patch, the inpainting patch comprising the inpainting pixel, pixels that are adjacent to the inpainting pixel and encoded prior to the pixels of the current block, and pixels of the current block adjacent to the inpainting pixel;
determining, from among pixels that are encoded prior to the pixels of the current block, a prediction patch of pixels that is most similar to the inpainting pixel and the pixels of the inpainting patch that are adjacent to the inpainting pixel and encoded prior to the pixels of the current block;
setting pixel values of pixels of the prediction patch, corresponding to the pixels of the current block adjacent to the inpainting pixel, as prediction values of a prediction block of the current block;
subtracting the prediction block from the current block to generate a residual block; and
encoding the residual block.

* * * * *